United States Patent
Sasamoto

(10) Patent No.: US 7,654,756 B2
(45) Date of Patent: Feb. 2, 2010

(54) ACTUATOR DRIVE CIRCUIT AND ACTUATOR DEVICE

(75) Inventor: Yutaka Sasamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 413 days.

(21) Appl. No.: 11/628,786

(22) PCT Filed: Jun. 9, 2005

(86) PCT No.: PCT/JP2005/010562
§ 371 (c)(1), (2), (4) Date: Dec. 6, 2006

(87) PCT Pub. No.: WO2005/121890
PCT Pub. Date: Dec. 22, 2005

(65) Prior Publication Data
US 2008/0031616 A1 Feb. 7, 2008

(30) Foreign Application Priority Data
Jun. 14, 2004 (JP) .............................. 2004-176239

(51) Int. Cl.
*G03B 9/08* (2006.01)
(52) U.S. Cl. .................. 396/463; 396/183; 396/508; 318/805; 318/806; 318/812
(58) Field of Classification Search ............ 396/183, 396/235, 244, 452, 463, 465, 508; 318/805, 318/806, 812; 388/809, 815
See application file for complete search history.

(56) References Cited

U.S. PATENT DOCUMENTS

| 3,835,403 | A | * | 9/1974 | Leinemann | 327/126 |
| 4,423,934 | A | * | 1/1984 | Lambeth et al. | 396/661 |
| 4,763,155 | A | | 8/1988 | Oda et al. | 396/235 |
| 4,864,346 | A | | 9/1989 | Shinozaki et al. | 396/244 |
| 2001/0048475 | A1 | * | 12/2001 | Shiomi | 348/208 |
| 2004/0252990 | A1 | * | 12/2004 | Ichimasa | 396/206 |

FOREIGN PATENT DOCUMENTS

| JP | 59-116633 | 7/1984 |
| JP | 61-46708 | 3/1986 |
| JP | 63-146416 | 6/1988 |
| JP | 02-262630 | 10/1990 |

(Continued)

*Primary Examiner*—W. B. Perkey
*Assistant Examiner*—Warren K Fenwick
(74) *Attorney, Agent, or Firm*—Fish & Richardson P.C.

(57) ABSTRACT

An actuator drive circuit includes a counter starting counting of a frequency-divided clock obtained by dividing a frequency of a reference clock in response to an activation signal, a D/A converter providing a converted voltage increasing gradually and stepwise in response to an output of the counter, a coil current control amplifier comparing a coil current detection voltage corresponding to a value of a coil current of the actuator with the converted voltage immediately after activation, comparing the coil current detection voltage with a coil current limitation reference voltage corresponding to an upper limit value of the coil current after the converted voltage matches the coil current limitation reference voltage, and providing an amplified output voltage prepared by amplifying a difference between the compared voltages, and a drive current output circuit providing a drive current of the actuator according to the amplified output voltage of the coil current control amplifier.

5 Claims, 3 Drawing Sheets

FOREIGN PATENT DOCUMENTS

| | | |
|---|---|---|
| JP | 06-41398 | 5/1994 |
| JP | 2567230 | 10/1996 |
| JP | 2608705 | 5/1997 |
| JP | 2001-033845 | 2/2001 |
| JP | 2003-043554 | 2/2003 |
| JP | 2003-235293 | 8/2003 |

* cited by examiner

US 7,654,756 B2

ACTUATOR DRIVE CIRCUIT AND ACTUATOR DEVICE

TECHNICAL FIELD

The present invention relates to a shutter actuator drive circuit driving an actuator for a shutter in a digital camera or the like as well as a shutter actuator device, i.e., an actuator device for a shutter using the same.

BACKGROUND ART

A structure disclosed, e.g., in Japanese Patent Laying-Open No. 2003-043554 (Patent Document 1) has been known as the above kind of shutter actuator device, and FIG. 4 shows a shutter actuator device similar to the disclosed device. This shutter actuator device includes a shutter actuator drive circuit 101, a shutter actuator 8 that is driven by shutter actuator drive circuit 101 to operate a shutter (not shown) and a coil current detection element 9 that detects a coil current $I_L$ of shutter actuator 8, and provides a coil current detection voltage $V_{DET}$ corresponding to a value of coil current $I_L$ to a coil current detection terminal DET of shutter actuator drive circuit 101.

Shutter actuator drive circuit 101 includes a Zener diode 131, a constant current supply 132 having opposite ends connected to Zener diode 131 and an internal power supply voltage $V_{CC}$, respectively, resistances 133 and 134 arranged in series between a ground potential point and a connection point between Zener diode 131 and constant current supply 132, and a capacitor 135 arranged in parallel to resistance 134. Shutter actuator drive circuit 101 further includes an NPN bipolar transistor 136 that has a collector connected to a connection point (node N) between resistances 133 and 134, a base receiving an activation signal from an activation signal input terminal ST and a grounded emitter, a coil current control amplifier 115 receiving on its noninverting input terminal a voltage on node N, and receiving, on its inverting input terminal, coil current detection voltage $V_{DET}$ from coil current detection terminal DET for amplifying a difference between them, and an NPN bipolar transistor 119 having a base receiving an output voltage of coil current control amplifier 115, an emitter connected to coil current detection terminal DET and a collector connected to the other end of shutter actuator 8 via an output terminal OUT2.

Resistances 133 and 134 as well as capacitor 135 from a CR integrator. A power supply voltage $V_M$ for driving the actuator is connected to one end of shutter actuator 8 via an output terminal OUT1.

Shutter actuator drive circuit 101 operates as follows.

When the activation signal on activation signal input terminal ST attains a low level (i.e., when the shutter actuator device becomes active), a current of constant current supply 132 flows into the CR integrator formed of capacitor 135 and resistances 133 and 134. The CR integrator gradually raises the voltage on node N, and will maintain the raised voltage after the voltage becomes equal to a voltage obtained by dividing the constant voltage generated by Zener diode 131 by resistances 133 and 134. Coil current detection voltage $V_{DET}$ follows the voltage on node N, and therefore the current flowing through coil current detection element 9, i.e., coil current $I_L$ likewise follows it, rises to an upper limit value $I_{MAX}$ and will maintain it.

Coil current $I_L$ of shutter actuator 8 does not rapidly rise due to its dielectric properties. If the CR integrator were not used for controlling the rising of coil current $I_L$, the time required for raising coil current $I_L$ to upper limit value $I_{MAX}$ would vary according to variations in actuator drive power supply voltage $V_M$ as illustrated by waveforms A and B in FIG. 5.

Waveform A occurs when actuator drive power supply voltage $V_M$ takes a maximum value. Waveform B occurs when actuator drive power supply voltage $V_M$ takes a minimum value. In shutter actuator drive circuit 101, a constant of the CR integrator is adjusted to increase coil current $I_L$ with a slight delay from waveform B so that the foregoing time is not affected by the variations in actuator drive power supply voltage $V_M$.

Patent Document 1: Japanese Patent Laying-Open No. 2003-043554

DISCLOSURE OF THE INVENTION

Problems to be Solved by the Invention

In a digital camera or the like, actuator drive power supply voltage $V_M$ varies depending on a degree of charging of a rechargeable battery. However, in the shutter actuator device using shutter actuator drive circuit 101 described above, variations in actuator drive power supply voltage $V_M$ do not affect the time required before coil current $I_L$ reaches upper limit value $I_{MAX}$.

Accordingly, such a situation can be prevented that the variations in actuator drive power supply voltage $V_M$ affects the times required for shutter operations and including the time required for raising coil current $I_L$ to its upper limit value $I_{MAX}$ as well as the shutter speed.

In practice, however, the constant of the CR integrator is liable to change due to temperatures and age deterioration. In practice, therefore, the time required for raising coil current $I_L$ to upper limit value $I_{MAX}$ likewise varies in the shutter actuator device using shutter actuator drive circuit 101 provided with the CR integrator.

In a semiconductor integrated device having shutter actuator drive circuit 101 integrated therein, a part or whole of the CR integrator circuit is arranged externally so that the semiconductor integrated device and a printed board carrying it have large sizes.

The invention has been developed in view of the above matters, and an object of the invention is to provide a shutter actuator drive circuit, i.e., an actuator drive circuit for a shutter that can operate a shutter actuator further precisely by reducing the time required for raising a coil current to an upper limit value without using a CR integrator as well as a shutter actuator device using the shutter actuator drive circuit.

Means for Solving the Problems

For achieving the above object, a shutter actuator drive circuit according to the invention includes a counter starting counting of a frequency-divided clock prepared by dividing a frequency of a reference clock in response to an activation signal; a D/A converter providing a converted voltage gradually increasing or decreasing in a stepwise fashion in response to an output of the counter; a coil current control amplifier comparing a coil current detection voltage corresponding to a value of a coil current of a shutter actuator with the converted voltage of the D/A converter immediately after activation, comparing the coil current detection voltage with a coil current limitation reference voltage corresponding to an upper limit value of the coil current after the converted voltage of the D/A converter matches with the coil current limitation reference voltage, and providing an amplified output voltage prepared by amplifying a difference between the compared voltages; and a drive current output circuit providing a drive current of the shutter actuator according to the amplified output voltage of the coil current control amplifier.

Preferably, the coil current control amplifier of the shutter actuator drive circuit receives the coil current detection voltage, the coil current limitation reference voltage and the converted voltage of the D/A converter, and compares one of the coil current limitation reference voltage and the converted voltage of the D/A converter with the coil current detection voltage.

Preferably, when the counter of the shutter actuator drive circuit attains a value corresponding to the coil current limitation reference voltage, the counter holds the attained value to use the converted voltage of the D/A converter as the coil current limitation reference voltage, and the coil current control amplifier compares the coil current detection voltage with the converted voltage of the D/A converter.

Preferably, the shutter actuator drive circuit further includes a frequency division ratio select circuit selecting a frequency division ratio of the frequency-divided clock provided to the counter.

A shutter actuator device includes one of the shutter actuator drive circuits described above; a shutter actuator driven by the shutter actuator drive circuit to operate a shutter; and a coil current detection element detecting a coil current of the shutter actuator to provide a coil current detection voltage to the shutter actuator drive circuit.

Effects of the Invention

According to the shutter actuator drive circuit of the invention and the shutter actuator device using the same, since the coil current is controlled using the converted voltage of the D/A converter after the activation, it is possible to reduce variations in time required before the coil current reaches the upper limit value, and thereby to operate the shutter actuator with high precision.

DESCRIPTION OF THE REFERENCE SIGNS 1, 2, 101 shutter actuator drive circuit, 8 shutter actuator, 9 coil current detection element, 11 frequency divider circuit, 12 and 22 counter, 13 DAC, 14 coil current limitation reference voltage generator, 15 and 25 coil current control amplifier, 16 drive current output circuit, 17 frequency division ratio select circuit, 19 and 119 transistor, 131 Zener diode, 132 constant current supply, 133, 134 resistance, 135 capacitor

BEST MODES FOR CARRYING OUT THE INVENTION

Embodiments of the invention will now be described with reference to the drawings. In the following description, the same or corresponding portions bear the same reference numbers, and description thereof is not repeated.

Description will now be given on a shutter actuator drive circuit (i.e., a drive circuit of an actuator for a shutter) which is an embodiment of the invention as well as a shutter actuator device, i.e., an actuator device for the shutter.

Figure 1:
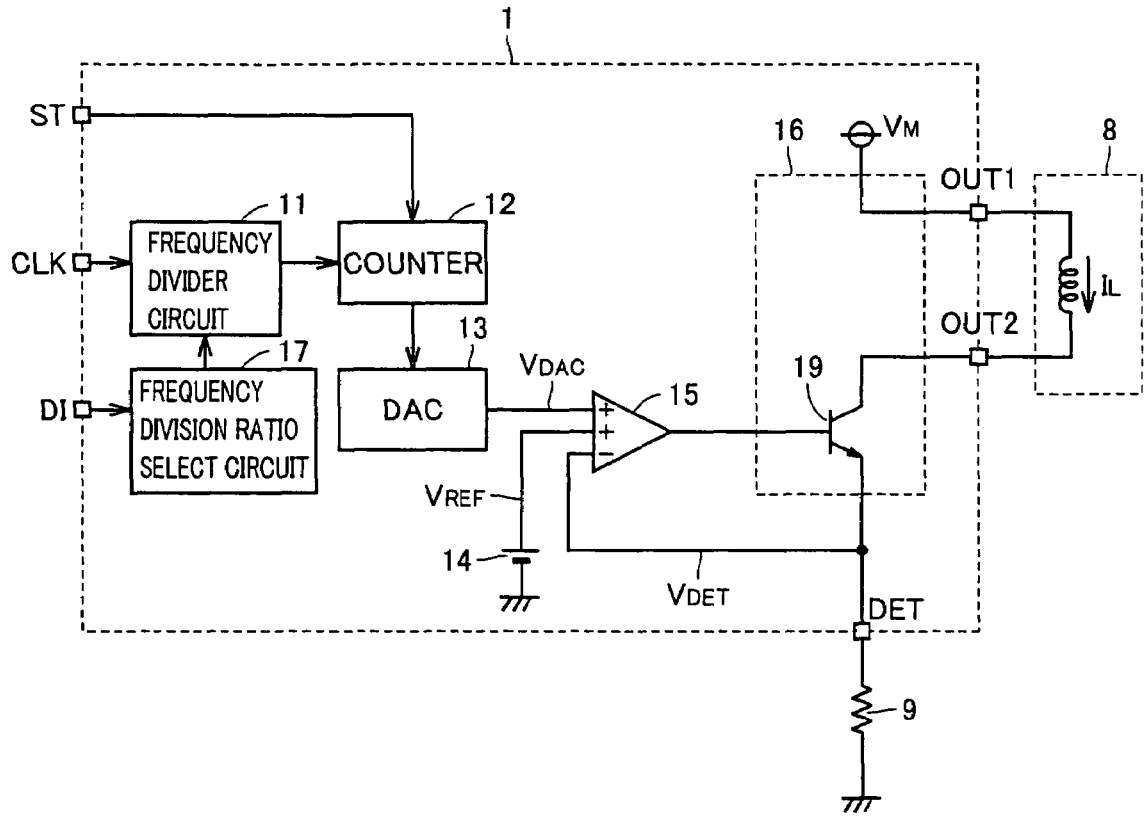
FIG. 1 shows a shutter actuator device according to an embodiment of the invention.

FIG. 1 illustrates a shutter actuator device according to an embodiment of the invention.

Referring to FIG. 1, the shutter actuator device according to the embodiment of the invention includes a shutter actuator drive circuit 1, a shutter actuator 8 that is driven by shutter actuator drive circuit 1 to operate a shutter (not shown), and a coil current detection element 9 that detects a coil current $I_L$ of shutter actuator 8 to provide a coil current detection voltage $V_{DET}$ corresponding to a value of coil current $I_L$ to a coil current detection terminal DET of shutter actuator drive circuit 1. More specifically, coil current detection element 9 is a resistance. The shutter actuator may be an electric motor, and may also be a plunger or the like actuating the shutter.

Shutter actuator drive circuit 1 has three input terminals, i.e., a clock input terminal CLK, an activation signal input terminal ST and a frequency division signal input terminal DI, and also has two output terminals OUT1 and OUT2 as well as foregoing coil current detection terminal DET.

Three input terminals CLK, ST and DI are connected to one or more controller(s) (not shown) of a microcomputer(s) or the like, receive a reference clock, an activation signal and a frequency division signal from the controller(s), respectively. The reference clock supplied to clock input terminal CLK is generated by an oscillator circuit such as a piezoelectric vibrator or the like in the controller, and is used as a system clock and the like. Two output terminals OUT1 and OUT2 are connected to shutter actuator 8 for providing a drive current to shutter actuator 8.

Clock input terminal CLK is connected to a frequency divider circuit 11, which provides a frequency-divided clock by dividing the reference clock. A counter 12 is connected to a downstream end of frequency divider circuit 11 and activation signal input terminal ST. Counter 12 starts counting of the frequency-divided clock in response to the activation signal provided from activation signal input terminal ST.

A D/A converter (DAC) 13 is connected to a downstream end of counter 12 for providing a converted voltage $V_{DAC}$ that increases stepwise in response to the output of counter 12. A downstream end of D/A converter 13 is connected to one of noninverting input terminals of a coil current control amplifier 15.

Coil current control amplifier 15 has the two noninverting input terminals and one inverting input terminal, and the other noninverting input terminal is connected to a reference voltage generator 14 for coil current limitation. The inverting input terminal is connected to coil current detection terminal DET. Coil current limitation reference voltage generator 14 generates a reference voltage $V_{REF}$ for coil current limitation corresponding to an upper limit value $I_{MAX}$ of coil current $I_L$. Therefore, coil current control amplifier 15 receives converted voltage $V_{DAC}$ and coil current limitation reference voltage $V_{REF}$ on the respective noninverting input terminals, and also receives coil current detection voltage $V_{DET}$ on its inverting input terminal. Coil current control amplifier 15 compares a lower one between coil current limitation reference voltage $V_{REF}$ and converted voltage $V_{DAC}$ with a coil current detection voltage $V_{DET}$, and amplifies a difference between them to provide a voltage.

A drive current output circuit 16 is connected to a downstream end of coil current control amplifier 15. From output terminals OUT1 and OUT2, drive current output circuit 16 provides drive currents driving shutter actuator 8 according to the amplified output voltage of coil current control amplifier 15. In shutter actuator drive circuit 1, frequency division signal input terminal DI is connected to a frequency division ratio select circuit 17, which selects a frequency division ratio of the frequency-divided clock provided from frequency divider circuit 11.

Drive current output circuit 16 already described includes an NPN bipolar transistor 19 as a major component. Transistor 19 has a collector connected to one end of output terminal OUT2, and actuator drive power supply voltage $V_M$, output terminal OUT1, shutter actuator 8 and output terminal OUT2 are connected is series in this order. Further, transistor 19 has an emitter connected to coil current detection terminal DET and a base connected to the output terminal of coil current control amplifier 15. Drive current output circuit 16 controls the drive current, i.e., coil current $I_L$ under the control of the amplified output voltage of coil current control amplifier 15 received on its base, and thereby drives shutter actuator 8 in one direction to close the shutter.

An operation of shutter actuator drive circuit 1 will now be described with reference to a waveform diagram of FIG. 2.

Figure 2:
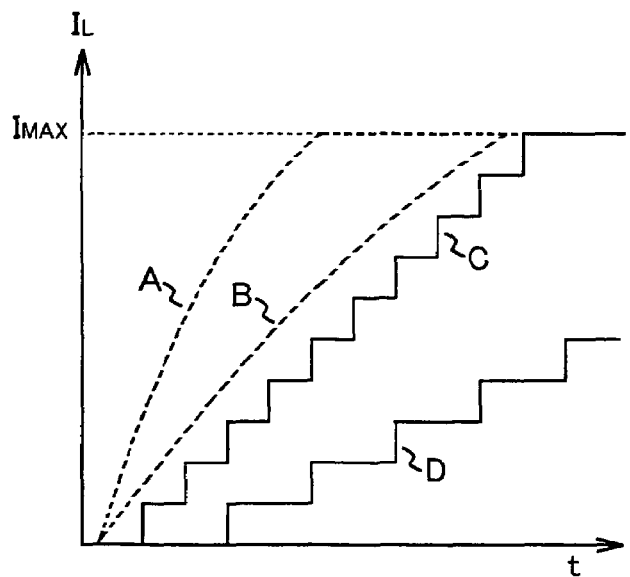
FIG. 2 is a waveform diagram illustrating an operation of a shutter actuator drive circuit 1.
Figure 5:
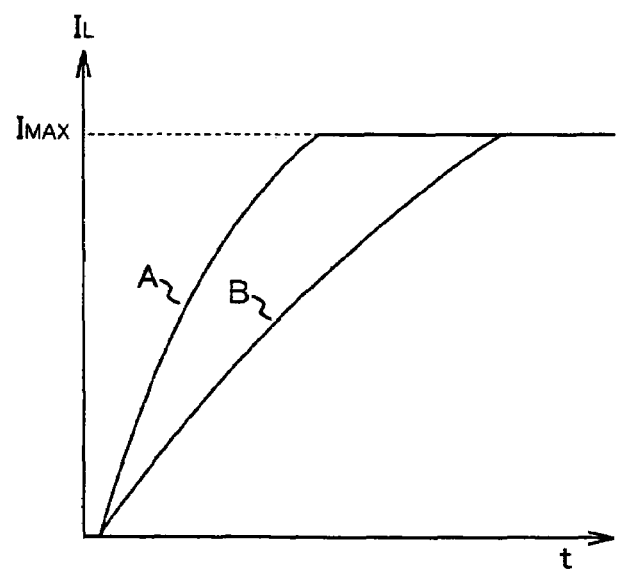
FIG. 5 illustrates a case where a time required for raising a coil current $I_L$ to its upper limit value $I_{MAX}$ varies according to variations in actuator drive power supply voltage $V_M$.

Referring to FIG. 2, a waveform C represents coil current $I_L$ of shutter actuator 8 that flows after the activation signal is supplied to activation signal input terminal ST to activate shutter actuator drive circuit 1. A waveform D is obtained when the frequency division ratio of the frequency-divided clock is twice as large as that of waveform C. Waveforms A and B depicted by broken lines that are identical to waveforms A and B in FIG. 5 represent coil currents $I_L$ flowing in the case where coil current control amplifier 15 always makes a comparison between coil current limitation reference voltage $V_{REF}$ and coil current detection voltage $V_{DET}$ without using D/A converter 13 providing converted voltage $V_{DAC}$ that increases gradually after the activation. Waveform A appears when an actuator drive power supply voltage $V_M$ takes a maximum value, and waveform B appears when actuator drive power supply voltage $V_M$ takes a minimum value.

Before shutter actuator drive circuit 1 becomes active, i.e., before activation signal input terminal ST receives the activation signal, counter 12 is in the initial state, and converted voltage $V_{DAC}$ of D/A converter 13 is zero.

Accordingly, the current flowing through coil current detection element 9, i.e., coil current $I_L$ of shutter actuator 8 is zero. When a controller (not shown) provides the activation signal to activation signal input terminal ST to operate the shutter, counter 12 starts counting. D/A converter 13 provides converted voltage $V_{DAC}$ that increases gradually and stepwise in response to the output of counter 12. Immediately after this activation, since converted voltage $V_{DAC}$ is lower than coil current limitation reference voltage $V_{REF}$, coil current control amplifier 15 compares converted voltage $V_{DAC}$ with coil current detection voltage $V_{DET}$. Accordingly, coil current detection voltage $V_{DET}$ increases with converted voltage $V_{DAC}$, and thereby coil current $I_L$ increases stepwise as illustrated by waveform C.

After converted voltage $V_{DAC}$ of D/A converter 13 further increases and matches with coil current limitation reference voltage $V_{REF}$, coil current limitation reference voltage $V_{REF}$ is lower than converted voltage $V_{DAC}$, and therefore, coil current limitation reference voltage $V_{REF}$ is compared with coil current detection voltage $V_{DET}$. Consequently, the current flowing through coil current detection element 9, i.e., coil current $I_L$ of shutter actuator 8 maintains upper limit value $I_{MAX}$.

If D/A converter 13 is not used, the time required for increasing coil current $I_L$ to upper limit value $I_{MAX}$ varies according to variations in actuator drive power supply voltage $V_M$ as illustrated by waveforms A and B. Shutter actuator drive circuit 1 increases converted voltage $V_{DAC}$ of D/A converter 13 such that coil current $I_L$ increases with a slight delay from waveform B as illustrated by waveform C. Thereby, waveform C is not affected by the variations in actuator drive power supply voltage $V_M$.

If converted voltage $V_{DAC}$ increases earlier than waveform B, coil current $I_L$ cannot immediately follow converted voltage $V_{DAC}$ when actuator drive power supply voltage $V_M$ is takes a minimum value. Therefore, the time required for raising coil current $I_L$ to upper limit value $I_{MAX}$ varies with variations in actuator drive power supply voltage $V_M$.

An increasing rate of converted voltage $V_{DAC}$ of D/A converter 13 is adjusted by selecting the frequency division ratio of the frequency-divided clock provided from frequency divider circuit 11 when necessary. For example, when the frequency division ratio is changed such that the period of the frequency-divided clock is twice as large as that of waveform C, the increasing rate of coil current $I_L$ lowers to a half as illustrated by waveform D. When frequency division ratio is 1, the reference clock is the frequency-divided clock. In this case, counter 12 receives the reference clock.

Since the reference clock thus received is generated by the oscillator circuit of the piezoelectric vibrator or the like as described before, it has high precision, and the change in such precision due to temperatures and age deterioration is suppressed. Thus, the variations in actuator drive power supply voltage do not affect the time required for raising coil current $I_L$ to upper limit value $I_{MAX}$, and the influence of temperature, age deterioration and the like is small so that the shutter actuator can operate precisely, and therefore the shutter can operate precisely.

Description will now be given on a shutter actuator drive circuit of another embodiment of the invention as well as a shutter actuator device using the same.

Figure 3:
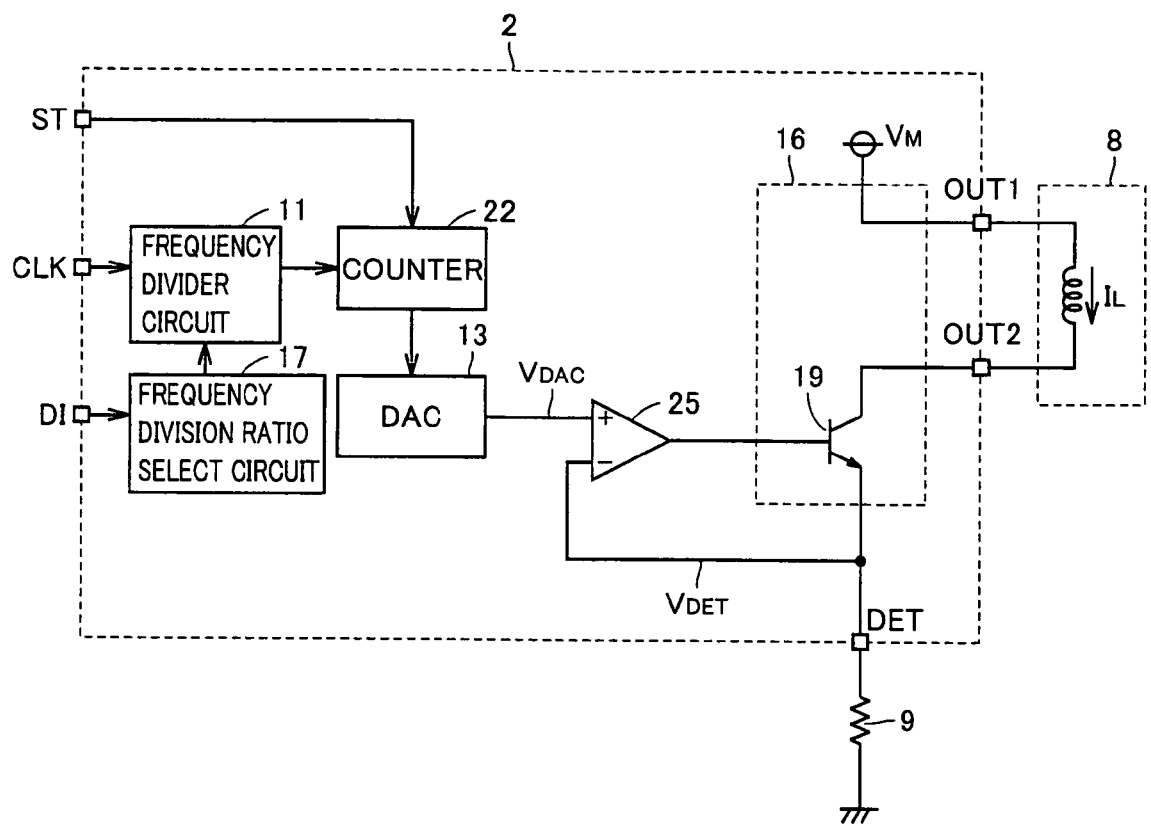
FIG. 3 shows a shutter actuator device according to another embodiment of the invention.
Figure 4:
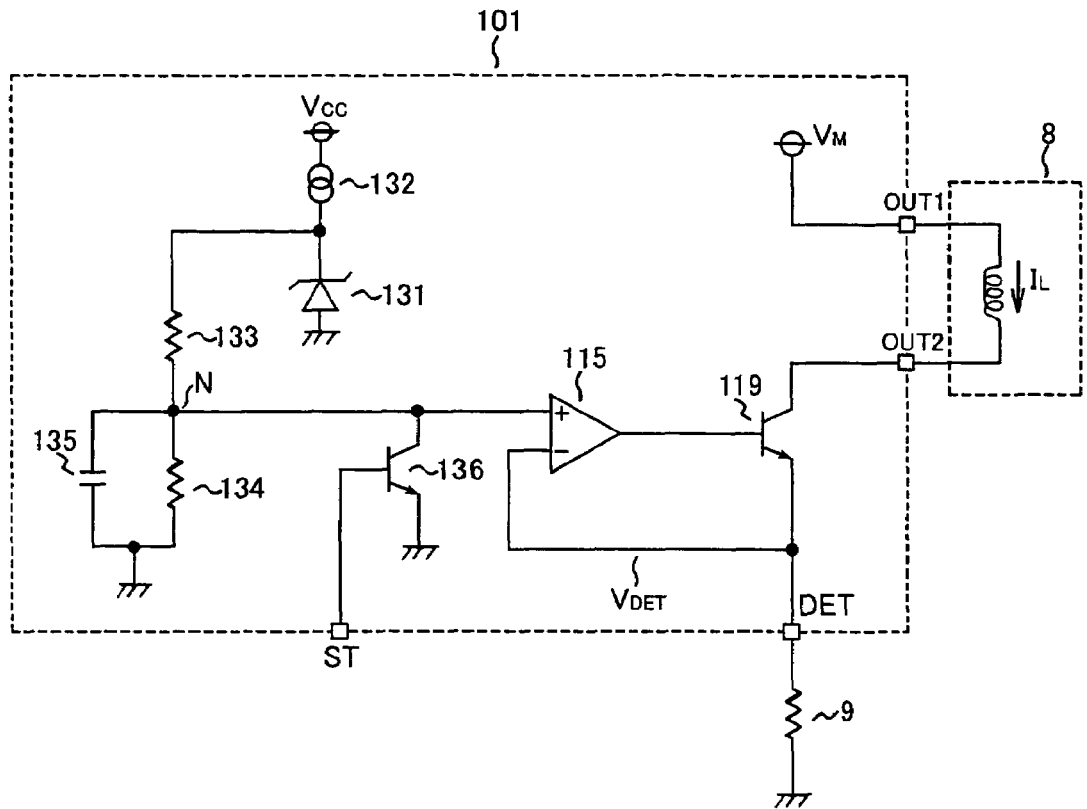
FIG. 4 illustrates a conventional shutter actuator device.

FIG. 3 shows the shutter actuator device according to this embodiment of the invention.

Referring to FIG. 3, the shutter actuator device according to this embodiment of the invention includes a shutter actuator drive circuit 2 instead of shutter actuator drive circuit 1. Shutter actuator drive circuit 2 includes a counter 22 and a coil current control amplifier 25 instead of counter 12 and coil current control amplifier 15 in shutter actuator drive circuit 1. When a count of counter 22 matches with a value (digital value) corresponding to coil current limitation reference voltage $V_{REF}$, counter 22 holds its count such that converted voltage $V_{DAC}$ of D/A converter 13 is used as coil current limitation reference voltage $V_{REF}$. Coil current control amplifier 25 receives coil current detection voltage $V_{DET}$ and converted voltage $V_{DAC}$, and compares them with each other. Owing to this structure, coil current control amplifier 25 compares coil current detection voltage $V_{DET}$ with converted voltage $V_{DAC}$ immediately after the activation, and will compare coil current detection voltage $V_{DET}$ with coil current limitation reference voltage $V_{REF}$ after converted voltage $V_{DAC}$ matches with coil current limitation reference voltage $V_{REF}$.

Shutter actuator drive circuit 2 does not require coil current limitation reference voltage generator 14 that generates coil current limitation reference voltage $V_{REF}$ of an analog value, and coil current control amplifier 25 has only one noninverting input terminal so that the circuit scale can be small.

In the shutter actuator device employing shutter actuator drive circuit 1 or 2, coil current detection element 9 is arranged on the ground potential side, but it may be arranged on the side of actuator drive power supply voltage $V_M$, in which case shutter actuator drive circuit 1 or 2 is configured such that transistor 19 is formed of a PNP bipolar transistor instead of the NPN bipolar transistor, and D/A converter 13 gradually decreases the output voltage after the activation.

Although the shutter actuator drive circuits and the shutter actuator devices of the embodiments of the invention have been described, the invention is not restricted to the foregoing embodiments, and various modifications can be made within the scope of the claims.

For example, drive current output circuit 16 is configured to drive shutter actuator 8 in one direction to close the shutter, but may have an H-bridge structure so that it can drive shutter actuator 8 in the opposite directions, i.e., in the closing and opening directions. Further, the frequency division ratio of the frequency-divided clock provided from frequency divider circuit 11 may be fixed, whereby frequency division signal input terminal DI and frequency division ratio select circuit 17 can be eliminated. Naturally, the NPN bipolar transistor may be replaced with an NMOS transistor, and the PNP bipolar transistor may be replaced with a PMOS transistor.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The shutter actuator drive circuit and the shutter actuator device according to the invention can be applied to digital cameras and others.

what is claimed is:

1. An actuator drive circuit comprising:
    a counter arranged to start counting of a frequency-divided clock obtained by dividing a frequency of a reference clock in response to an activation signal;
    a D/A converter arranged to provide a converted voltage gradually increasing or decreasing in a stepwise fashion in response to an output of said counter;
    a coil current control amplifier arranged to compare a coil current detection voltage corresponding to a value of a coil current of an actuator with the converted voltage of said D/A converter immediately after activation, arranged to compare said coil current detection voltage with a coil current limitation reference voltage corresponding to an upper limit value of the coil current after the converted voltage of said D/A converter matches with said coil current limitation reference voltage, and arranged to provide an amplified output voltage by amplifying a difference between the compared voltages; and
    a drive current output circuit arranged to provide a drive current of the actuator according to the amplified output voltage of said coil current control amplifier.

2. The actuator drive circuit according to claim 1, wherein said coil current control amplifier is arranged to receive said coil current detection voltage, said coil current limitation reference voltage and the converted voltage of said D/A converter, and is arranged to compare one of said coil current limitation reference voltage and the converted voltage of said D/A converter with said coil current detection voltage.

3. The actuator drive circuit according to claim 1, wherein said counter is arranged to hold its count to use the converted voltage of said D/A converter as said coil current limitation reference voltage when said counter attains a value corresponding to said coil current limitation reference voltage, and
    said coil current control amplifier is arranged to compare said coil current detection voltage with the converted voltage of said D/A converter.

4. The actuator drive circuit according to claim 1, 2 or 3 further comprising:
    a frequency division ratio select circuit arranged to select a frequency division ratio of the frequency-divided clock provided to said counter.

5. An actuator device comprising:
    an actuator drive circuit;
    an actuator driven by said actuator drive circuit to operate a shutter; and
    a coil current detection element arranged to detect a coil current of said actuator to provide said coil current detection voltage to said actuator drive circuit, wherein said actuator drive circuit includes:
        a counter arranged to start counting of a frequency-divided clock prepared by dividing a frequency of a reference clock in response to an activation signal,
        a D/A converter arranged to provide a converted voltage gradually increasing or decreasing in a stepwise fashion in response to an output of said counter,
        a coil current control amplifier arranged to compare the coil current detection voltage corresponding to the value of the coil current of the actuator with the converted voltage of said D/A converter immediately after activation, arranged to compare said coil current detection voltage with a coil current limitation reference voltage corresponding to an upper limit of the coil current after the converted voltage of said D/A converter matches with said coil current limitation reference voltage, and arranged to provide an amplified output voltage by amplifying a difference between the compared voltages, and
        a drive current output circuit providing a drive current of the actuator according to the amplified output voltage of said coil current control amplifier.

* * * * *